US012602583B2

(12) United States Patent
Howell et al.

(10) Patent No.: US 12,602,583 B2
(45) Date of Patent: Apr. 14, 2026

(54) METHOD OF TRAINING A NEURAL NETWORK TO CONTROL AN AIRCRAFT SYSTEM

(71) Applicants: Airbus Operations Limited, Bristol (GB); Airbus (S.A.S.), Blagnac (FR)

(72) Inventors: George Howell, Bristol (GB); Jean-Marie Dautelle, Blagnac (FR); Andrea Laruelo-Fernandez, Blagnac (FR); William Parr, Bristol (GB)

(73) Assignees: Airbus Operations Limited, Bristol (GB); Airbus (S.A.S.), Blagnac (FR)

( * ) Notice: Subject to any disclaimer, the term of this patent is extended or adjusted under 35 U.S.C. 154(b) by 994 days.

(21) Appl. No.: 17/686,041

(22) Filed: Mar. 3, 2022

(65) Prior Publication Data

US 2022/0284292 A1 Sep. 8, 2022

(30) Foreign Application Priority Data

Mar. 4, 2021 (GB) ..................................... 2103053

(51) Int. Cl.
*G06N 3/08* (2023.01)
*G06F 18/21* (2023.01)
(Continued)

(52) U.S. Cl.
CPC ............. *G06N 3/08* (2013.01); *G06F 18/217* (2023.01); *G06N 3/04* (2013.01); *G07C 5/02* (2013.01);
(Continued)

(58) Field of Classification Search
CPC ... G06N 3/08; G06N 3/04; G06N 3/02; G06F 18/217; G07C 5/02; G07C 5/0808;
(Continued)

(56) References Cited

U.S. PATENT DOCUMENTS 8,219,383 B2 7/2012 Statnikov et al.
9,561,863 B2 2/2017 Conrad
(Continued)

FOREIGN PATENT DOCUMENTS

CN 109164708 1/2019
CN 106649727 12/2019
(Continued)

OTHER PUBLICATIONS

Attenberg, Class Imbalance and Active Learning, Imbalanced Learning: Foundations, Algorithms, and Applications, First Edition. The Institute of Electrical and Electronics Engineers, 2013 (Year: 2013).*
(Continued)

*Primary Examiner* — Tiffany P Young
*Assistant Examiner* — Shien Ming Chou
(74) *Attorney, Agent, or Firm* — Nixon & Vanderhye P.C.

(57) ABSTRACT

A method of training a neural network to control an aircraft system. The method includes obtaining an operational mode data space representing a set of operational modes for the aircraft system, wherein each operational mode represents a configuration of the aircraft system where performance of an aircraft component is impaired according to an aircraft system model. Each operational mode includes probability data indicating a respective probability of the operational mode occurring, according to the model. The method includes generating a reduced operational mode data space including operational modes having a probability greater than a theoretical operational probability threshold, and generating a training operational mode data space including operational modes within the reduced operational mode data space that have a probability less than a real-world operational probability threshold. The method includes training the neural network using operational modes within the training operational mode data space.

21 Claims, 13 Drawing Sheets

(51) Int. Cl.

| | | |
|---|---|---|
| *G06N 3/04* | (2023.01) | |
| *G07C 5/02* | (2006.01) | |
| *G07C 5/08* | (2006.01) | |

(52) U.S. Cl.
CPC ......... *G07C 5/0808* (2013.01); *G07C 5/0841*
(2013.01)

(58) Field of Classification Search
CPC ......... G07C 5/0841; B64C 25/44; B64F 5/60;
B60T 8/174; B60T 8/1703; G05B 13/027
USPC ............................................................ 701/3
See application file for complete search history.

(56) References Cited

U.S. PATENT DOCUMENTS

| | | | |
|---|---|---|---|
| 10,095,813 | B2 | 10/2018 | Ramesh et al. |
| 10,180,995 | B2 | 1/2019 | Jones et al. |
| 2004/0010354 | A1 | 1/2004 | Nicholas et al. |
| 2006/0064291 | A1* | 3/2006 | Pattipatti ............ G05B 23/0251 |
| | | | 703/14 |
| 2015/0019187 | A1* | 1/2015 | Jones ...................... G06F 30/20 |
| | | | 703/8 |
| 2018/0253645 | A1 | 9/2018 | Burr |
| 2020/0074266 | A1* | 3/2020 | Peake .................. G06V 10/764 |
| 2020/0209848 | A1* | 7/2020 | Mercep ................ G05D 1/0088 |
| 2022/0101198 | A1* | 3/2022 | Freed ..................... G06N 20/00 |
| 2023/0022505 | A1* | 1/2023 | Howell ................... B64C 13/00 |

FOREIGN PATENT DOCUMENTS

| | | |
|---|---|---|
| EP | 2 974 922 | 1/2016 |
| GB | 2590671 | 7/2021 |
| WO | 2015/158198 | 10/2015 |

OTHER PUBLICATIONS

Quality-One FMECA Failure Mode, Effects & Criticality Analysis, quality-one.com 2020 (Year: 2020).*
Investopedia, Representative Sample, www.investopedia.com, 2011 (Year: 2011).*
Liu, Generative Adversarial Network Based Multi-class Imbalanced Fault Diagnosis of Rolling Bearing, 2019 4th International Conference on System Reliability and Safety (Year: 2019).*
Wang, A Comprehensive Survey on Curriculum Learning, arXiv, 2020 (Year: 2020).*
European Search Report cited in EP 22159778.4 mailed Nov. 23, 2022, 10 pages.
Jovan Boskovic et al. "A Decentralized Scheme For Accommodation of Multiple Simultaneous Actuator Failures", Proceedings of the 2002 American Control Conference Acc. Anchorage, AL, May 8-10, 2002, 6 pages.
Jovan Boskovic et al. "Failure Detection, Identification and Reconfiguration System For A Redundant Actuator Assembly", 5th IFAC Symposium On Fault Detection, Supervision and Safety of Technical Processes 2003, Washington, DC, Jun. 9-11, Jun. 11, 2003, 6 pages.
Search and Examination Report for GB2103053.1, dated Aug. 17, 2021, 9 pages.
Mackall et al., Verification & Validation of Neural Networks for Aerospace Systems, NASA, Jun. 12, 2002, 85 pages.
Iannace et al., "Fault Diagnosis for UAV Blades Using Artificial Neural Network", Robotics 2019, Jul. 20, 2019, 17 pages.
Cerqueira et al., "Evaluating Time Series Forecasting Models", May 29, 2019, 28 pages.
Korvesis, "Machine Learning for Predictive Maintenance in Aviation", HAL Archives-ouvertes, submitted Feb. 1, 2019, 161 pages.
Corbetta, "Application of sparse identification of nonlinear dynamics for physics-informed learning," 2020 IEEE Aerospace Conference, Mar. 2020, pp. 1-8.

* cited by examiner

100

Obtain Operational Mode Data Space
102

Generate Reduced Operational Mode Data Space
104

Generate Training Operational Mode Data Space
106

Train Neural Network
108

100

Obtain Operational Mode Data Space
102

Generate Reduced Operational Mode Data Space
104

Generate Training Operational Mode Data Space
106

Train Neural Network
108

Monitor Outputs
110

Identify node/combination of nodes
112

Modify operational modes used in training
114

METHOD OF TRAINING A NEURAL NETWORK TO CONTROL AN AIRCRAFT SYSTEM

RELATED APPLICATION

This incorporates by reference and claims priority to United Kingdom patent application GB2103053.1, filed Mar. 4, 2021.

TECHNICAL FIELD

The present invention relates to a method of training a neural network to control an aircraft system.

BACKGROUND

In modern commercial aircraft, it is conventional to use a fly-by-wire control system, where a computer system receives a pilot's control inputs and determines the appropriate control outputs, based on a variety of factors beyond those initial control inputs. Such systems can provide higher performance for the aircraft. The computer system will operate using software that is rigorously tested. New versions of the software are routinely developed and deployed that further improve aircraft performance.

Machine learning technologies such as neural networks have been demonstrated to offer performance advantages over conventional software in a number of fields. It would be desirable to use such technologies to implement a fly-by-wire control system for an aircraft.

SUMMARY

A first aspect of the present invention provides a method of training a neural network to control an aircraft system, the method comprising: obtaining an operational mode data space representing a set of operational modes for the aircraft system, wherein each operational mode represents a configuration of the aircraft system where performance of one or more of the plurality of components is impaired and comprises probability data indicating a respective probability of the operational mode occurring, according to a model of the aircraft system; generating a reduced operational mode data space comprising operational modes having a probability greater than a theoretical operational probability threshold; generating a training operational mode data space comprising operational modes within the reduced operational mode data space that have a probability less than a real-world operational probability threshold; and training the neural network using operational modes within the training operational mode data space.

The first aspect of the present invention may be beneficial as the training operational mode data space comprises operational modes within the reduced operational mode data space that have a probability less than a real-world operational probability threshold. In particular, by training the neural network using operational modes that are less likely to occur in real-world operation of the aircraft system, the neural network may be better equipped to deal with a wider range of operational modes, including operational modes that are more likely to, and less likely to, occur during real-world operation of the aircraft system. This may be preferable to simply randomly selecting operational modes from the operational mode data space and training the neural network using those randomly selected operational modes.

Furthermore, in practice the operational mode data space may be relatively large, for example comprising a magnitude in the order of $10^{50}$ operational modes or greater. By initially generating a reduced operational mode data space using operational modes having a probability greater than a theoretical operational probability threshold, those operational modes which are statistically unlikely in theory, let alone in practice, may be removed from consideration, which may provide a reduced data set of a more manageable magnitude from which the neural network can be trained.

The theoretical operational probability threshold may comprise a threshold utilised for all theoretical operational modes, for example with the theoretical operational probability threshold set such that operational modes having a probability less than the theoretical operational probability threshold are deemed sufficiently unlikely to occur in theory.

The real-world operational probability threshold may comprise a threshold above which operational modes are deemed likely to occur in real-world operation of the aircraft system, and below which operational modes are deemed unlikely to occur in real-world operation of the aircraft system.

Generating a reduced operational mode data space may comprise comparing obtained probability data for each operational mode to the theoretical operational probability threshold, and removing operational modes having a probability less than or equal to the theoretical operational probability threshold from the operational mode data space to leave behind the reduced operational mode data space.

Generating the training operational mode data space may comprise comparing obtained probability data for operational modes within the reduced operational mode data space to the real-world operational probability threshold, and removing operational modes having a probability greater than or equal to the real-world operational probability threshold from the reduced operational mode data space to leave behind the training operational mode data space.

Generating the reduced operational mode data space may comprise removing physically impossible operational modes, for example operational modes which are theoretically possible but physically impossible given the real-world constraints of the aircraft system, from the operational mode data space.

The method may comprise stratifying the training operational mode data space to generate a plurality of sub-spaces based on the obtained probability data, selecting a first set of operational modes from the plurality of sub-spaces, selecting a second set of operational modes from the plurality of sub-spaces, the second set of operational modes different from the first set of operational modes, training the neural network using the first set of operational modes, and testing the neural network using the second set of operational modes. In such a manner both training and test data for the neural network may be obtained from the training operational mode data space. Stratifying the training operational mode data space based on the obtained probability data may also enable the probability distribution of the reduced operational mode data space to be respected. Each sub-space may comprise operational modes having a probability value of the same magnitude, for example with one sub-space comprising operational modes having a probability value of the magnitude of $10^{-9}$, another sub-space comprising operational modes having a probability value of the magnitude of $10^{-10}$, and so on.

Each operational mode of the first set of operational modes may be different from each operational mode of the second set of operational modes. This may ensure independence of the first and second sets of operational modes, and may ensure that the neural network is trained and tested using independent data.

Selecting the first and second sets of operational modes may comprise randomly selecting the first and second sets of operational modes from the plurality of sub-spaces, for example randomly selecting operational modes from within each of the plurality of sub-spaces to generate the first and second sets of operational modes. This may ensure a fair distribution of the operational modes used to train and test the neural network.

Selecting the first and second sets of operational modes may comprise selecting operational modes from the plurality of sub-spaces such that each of the first and second sets of operational modes has the same distribution of probabilities as the training operational mode data space. Each of the first and second sets of operational modes may comprise the same proportion of operational modes sharing a probability magnitude as the plurality of sub-spaces. For example, where the distribution of the plurality of sub-spaces comprises 20% of operational modes having a probability value of the magnitude of $10^{-9}$, 20% of the operational modes of each of the first and second sets of operational modes may comprise a probability value having a magnitude of $10^{-9}$. This may ensure that the overall probability distribution of operational modes is respected in the first and second sets of operational modes used to train and test the neural network.

The method may comprise stratifying the plurality of sub-spaces based on a structure of the aircraft system to generate a plurality of further sub-spaces, selecting the first set of operational modes from the plurality of further sub-spaces and selecting the second set of operational modes from the plurality of further sub-spaces. This may ensure that the aircraft system is properly represented within the first and second sets of operational modes, and hence that the aircraft system is properly represented with the operational modes used to train and test the neural network. The structure of the aircraft system may comprise component count and/or component layout of the aircraft system. The method may comprise a plurality of stratification steps based on the obtained probability data and/or the structure of the aircraft system.

The method may comprise generating an operational mode data space using operational modes present in the reduced operational mode data space but absent from the training operational mode data space, and verifying operation of the neural network using operational modes within the operational mode data space. This may ensure verification of the neural network using operational modes independent from the operational modes used to train and test the neural network. By generating a operational mode data space using operational modes present in the reduced operational mode data space but absent from the training operational mode data space, the operational mode data space may comprise operational modes that have a probability greater than or equal to the real-world operational probability threshold, i.e. those operational modes that are more likely to occur during real-world operation of the aircraft system. This may ensure that the neural network, when operating in the aircraft system, is capable of identifying those operational modes that are more likely to occur during real-world operation of the aircraft system The theoretical operational probability threshold may be set such that operational modes present in the operational mode data space but absent from the reduced operational mode data space comprise a cumulative probability less than an acceptable safety level for the aircraft system, for example with the acceptable safety level of the aircraft system determined based on a determined most critical operational mode of the aircraft system. This may ensure that a required safety level for the aircraft system is met, for example by not excluding a set of operational modes from the training of the neural network that results in a cumulative probability of those operational modes actually used in the training of the neural network increasing above a required safety level.

A size of the operational mode data space may be determined based on a maximum acceptable probability of a determined critical operational mode according to the model of the aircraft system, and an operational mode having a highest probability according to the model of the aircraft system. This may ensure that there are no operational modes or combinations of operational modes that could impact the worst-case safety rate based on the most probable operational modes.

The neural network may comprise a plurality of nodes, and the method may comprise monitoring outputs from the plurality of nodes during training of the neural network to determine activity data representing activity of the plurality of nodes, identifying a node or combination of nodes having activity levels below an activity level threshold using the activity data, and modifying the operational modes used to train the neural network based on the identified node or combination of nodes. This may enable modification of the neural network to ensure that the neural network is operating to the desired level of accuracy, and/or may allow for modification of the neural network to remove unnecessary nodes or unnecessary combinations of nodes. For example, operational modes may be added to ensure that each node or combination of nodes of the neural network is utilised to provide full design space coverage. Alternatively, this may enable modification of the neural network to ensure that the neural network is operating to the desired level of accuracy, and/or may allow for modification of the neural network to remove unnecessary nodes or unnecessary combinations of nodes. For example rarely used output nodes of the neural network may be removed, whilst retaining the accuracy of output of the neural network.

Modifying the operational modes used to train the neural network based on the identified node or combination of nodes may comprise utilising a greater number of operational modes from within the training operational mode data space. Modifying the operational modes used to train the neural network may comprise adding operational modes from the second set of operational modes to the first set of operational modes. This may move operational modes from the testing data to the training data, and may result in increased design space coverage through increased activation of identified low activity level nodes or combinations of nodes as a result of the increased size of training data.

Modifying the operational modes used to train the neural network based on the identified node or combination of nodes may comprise adding operational modes to the training operational mode data space from the reduced operational mode data space. For example, where all operational modes initially contained within the training operational mode data space are used to train the neural network, the method may comprise removing operational modes from the reduced operational mode data space and inserting removed operational modes into the training operational mode data space, thereby increasing a size of the training operational mode data space.

Modifying the operational modes used to train the neural network based on the identified node or combination of nodes may comprise adding operational modes to the training operational mode data space from the operational mode data space. For example, where all operational modes initially contained within the training operational mode data space and the reduced operational mode data space are used to train the neural network, the method may comprise removing operational modes from the operational mode data space and inserting removed operational modes into the training operational mode data space, thereby increasing a size of the training operational mode data space.

The model of the aircraft system may comprise a directed graph comprising one or more vertices, and each vertex may represent operation of a component of the aircraft system.

The aircraft system may comprise a braking system, and each operational mode may represent a respective set of possible braking component impairments according to a model of the braking system.

A second aspect of the present invention provides a method of training a neural network to control an aircraft braking system having a plurality of aircraft braking system components, the method comprising: obtaining an aircraft braking system operational mode data space representing a set of operational modes for the aircraft braking system, wherein each operational mode represents a configuration of the aircraft braking system where performance of one or more of the plurality of aircraft braking system components is impaired according to a model of the aircraft braking system; obtaining probability data indicative of probabilities of the operational modes occurring; comparing obtained probability data for each operational mode to a theoretical operational probability threshold; removing operational modes having a probability less than or equal to the theoretical operational probability threshold from the aircraft braking system operational mode data space to leave behind a reduced aircraft braking system operational mode data space; comparing obtained probability data for operational modes within the reduced aircraft braking system operational mode data space to a real-world operational probability threshold; removing operational modes having a probability greater than or equal to the real-world operational probability threshold from the reduced aircraft braking system operational mode data space to leave behind a training aircraft braking system operational mode data space; and training the neural network using operational modes within the training aircraft braking system operational mode data space.

A third aspect of the present invention provides a method of programming an aircraft control system to include the logic of a neural network trained according to the method of the first or second aspects of the present invention.

A fourth aspect of the present invention provides a data carrier comprising machine-readable instructions for the operation of a processor of a computer system to perform the method according to the first or second aspects of the present invention.

A fifth aspect of the present invention provides a computer system for training a neural network to control an aircraft system, the computer system comprising a processor and a data carrier according to the fourth aspect of the present invention.

A sixth aspect of the present invention provides an aircraft system comprising a neural network trained according to the method of the first or second aspects of the present invention.

A seventh aspect of the present invention provides an aircraft comprising an aircraft system according to the sixth aspect of the present invention.

BRIEF DESCRIPTION OF THE DRAWINGS

Embodiments of the invention will now be described, by way of example only, with reference to the accompanying drawings, in which.

DETAILED DESCRIPTION

Figure 1:
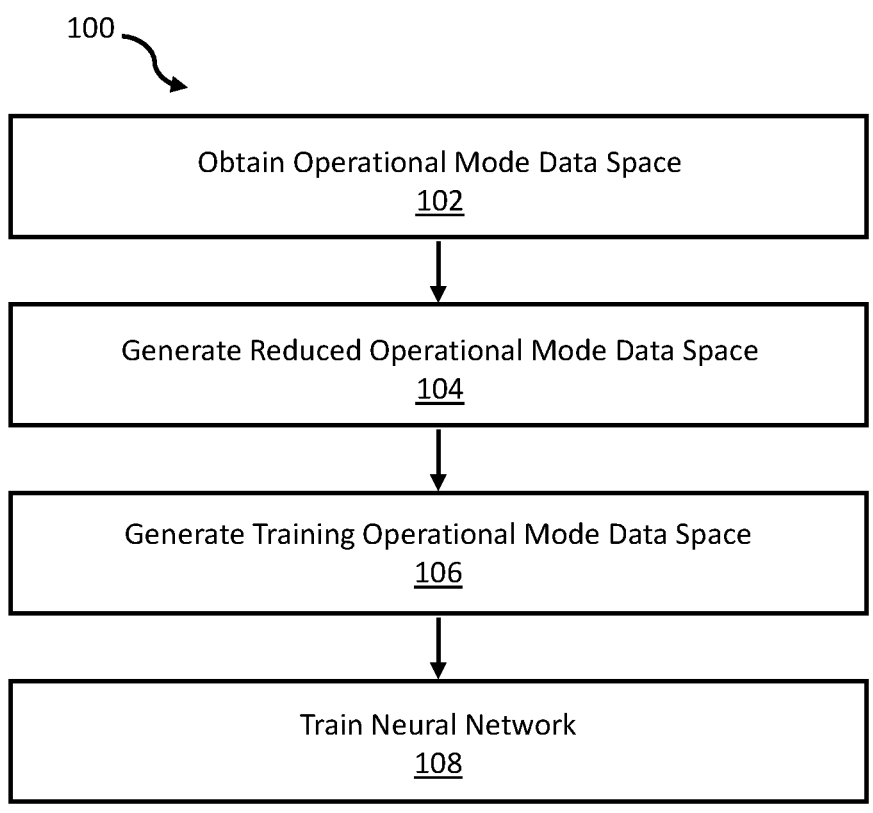
FIG. 1 is a flow chart illustrating a method according to the present invention.

Aircraft systems typically comprise many component parts, making up primary, secondary and even tertiary systems to ensure the continuity of performance of the aircraft system if performance of one or more component parts is impaired. Each of those component parts may carry with it an associated probability of an impaired component operation occurring, with impaired component operation indicative of the operation of the component outside of its normal operating specifications. Where operation of one or more components is impaired, and a secondary or tertiary system is required to be used, the system can be said to be operating in an operational mode in which the system is operating at a reduced level of redundancy.

If we consider an aircraft system comprising 285 component parts, each having a single possible type of impaired component operation, then this leads to a total theoretical number of impaired component operation combinations of over $10^{74}$, each leading to a distinct operational mode. It will be appreciated that in practice each component may have more than one possible impaired component operation type, which further increases the number of impaired component operation combinations.

Artificial intelligence and neural networks are increasingly prevalent for automated system control. A neural network typically includes a number of interconnected nodes, which may be referred to as artificial neurons, or neurons. The internal state of a neuron (sometimes referred to as an "activation" of the neuron) typically depends on an input received by the neuron. The output of the neuron then depends on the input, weight, bias, and the activation function. The output of some neurons is connected to the input of other neurons, forming a directed, weighted graph in which vertices (corresponding to neurons) or edges (corresponding to connections) of the graph are associated with weights, respectively. The neurons may be arranged in layers such that information may flow from a given neuron in one layer to one or more neurons in a successive layer of the neural network.

Given the stringent safety requirements for aircraft systems, a neural network to be used in control of an aircraft system is required to operate with a high degree of accuracy. Training of the neural network is important to ensure that such a high degree of accuracy is met. Examples of "trainable parameters" of the neural network are the weights, the biases, and the neuron connections that are "learnt", or in other words, capable of being trained, during a neural network "training" process. Training a neural network typically involves inputting a large amount of data, and making numerous iterations of adjustments to the neural network parameters in order to ensure that the trained neural network provides an accurate output.

Conventional fly-by-wire control systems are designed to cope with different categories of operational mode. The system will have different functions and contingencies that are executed in each category of operational mode which can be explored by reading the source code for the system and tested using a variety of simple tools.

Since neural networks cannot be analysed in the same way as conventional software, it is desirable to prove their robustness in even exceptionally rare conditions by training and verifying them with a wide variety of operational modes. Furthermore, such a network trained to handle impaired operation of distinct components may offer higher aircraft performance in such operational modes than a conventional fly-by-wire control system. Accordingly, it is desirable to train the neural network to handle a wide variety of operational modes.

However, as will be appreciated, a data set with as many as $10^{74}$ combinations of operational modes, as in the case of an aircraft system as mentioned above, may result in a training process that is computationally intensive and overly time consuming, to the degree that such a training process is infeasible in practice. Equally, sufficient data needs to be fed to the neural network during a training process to obtain a high degree of output accuracy. There is therefore a balance to be reached in terms of the size of a data set to be fed to a neural network during training and accuracy of a trained neural network output.

To this end, the present invention provides a method 100 of training a neural network to control an aircraft system, with the method 100 illustrated in FIG. 1. The method 100 includes obtaining 102 an operational mode data space representing a set of operational modes for the aircraft system, generating 104 a reduced operational mode data space comprising operational modes having a probability greater than a theoretical operational probability threshold, generating 106 a training operational mode data space comprising operational modes within the reduced operational mode data space that have a probability less than a real-world operational probability threshold, and training 108 the neural network using operational modes within the training operational mode data space. The steps of the method 100 will be described in more detail below with reference to an aircraft braking system, although it will be appreciated that the general teaching of the method 100 may be applied in training neural networks to control other types of aircraft system.

In the method 100, each operational mode represents a configuration of an aircraft braking system 400 (illustrated in FIG. 13) where performance of one or more of the plurality of components is impaired, with the minimum number of components operating out of specification in a set being one component. Each component of the aircraft braking system 400 has its own probability of impaired operation occurring, which will be known from historic data and/or the specifications of that component. Each operational mode therefore has a respective probability of occurring, with the possible operational modes and probabilities determined according to a model of the aircraft braking system 400.

Figure 2:
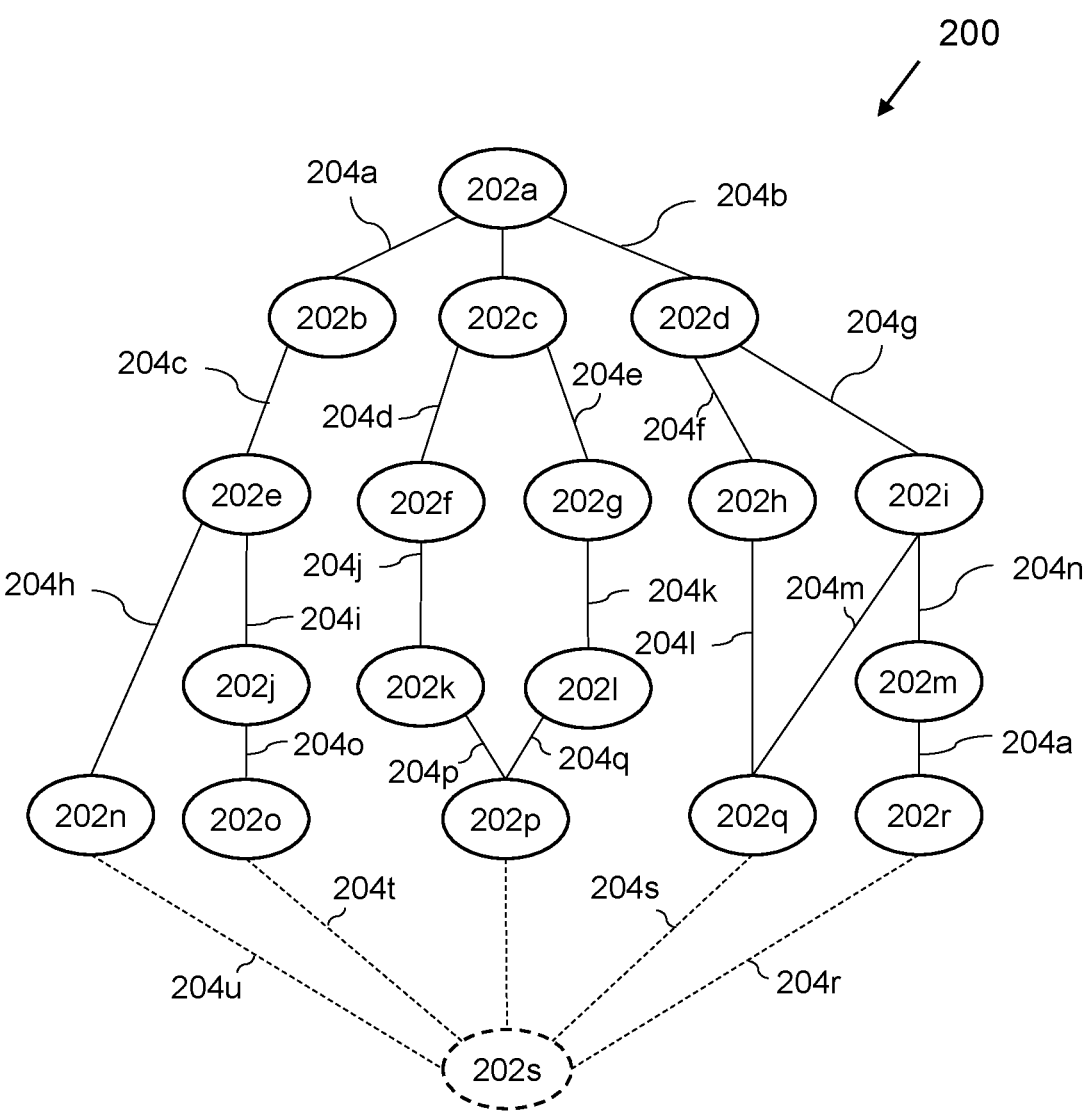
FIG. 2 is a graph representative of a model of an aircraft system according to the present invention.

An appropriate model of the aircraft braking system 400 is illustrated schematically in FIG. 2 as a directed graph 200 comprising a number of vertices, with each vertex representing operation of a component of the aircraft braking system 400. As can be seen, the directed graph 200 comprises a plurality of nodes 202*a* to 202*s* and a set of directed edges 204*a* to 204*u* connecting the plurality of nodes 202*a* to 202*s*. The plurality of nodes 202*a* to 202*s* comprises a start node 202*a* and at least one end node 202*n* to 202*s*. In the example shown in FIG. 2 one node 202*s* is shown in broken lines to indicate that a single end node 202*s* may be provided. In some examples, different pathways through the directed graph 200 may end at respective end nodes 202*n* to 202*r*. A common end node 202*s* can be used to end the pathways through the directed graph 200 at a common point and trigger an evaluation of the performance of the pathways. A plurality of operating procedures is generated by determining pathways in the graph model 200 from the start node 202*a* to at least one end node 202*n* to 402*s*.

The nodes 202*a* to 202*s* each represent a step in operating components of the aircraft braking system 400 for controlling the aircraft. In some examples, the plurality of nodes 202*a* to 202*s* comprises nodes which represent a component being operated in the aircraft system 400, as well as nodes which represent a manner in which a component is operated in the aircraft system 400. The operation of some components in the aircraft system 400 may be simple, for example a binary choice of on or off. The operation of other components in the aircraft system 400 may be more complex, for example involving a more granular choice of operation. Representing the components in the aircraft system 400 in this way in the directed graph 200 may greatly assist in identifying which potential operational modes are feasible.

Figure 3:
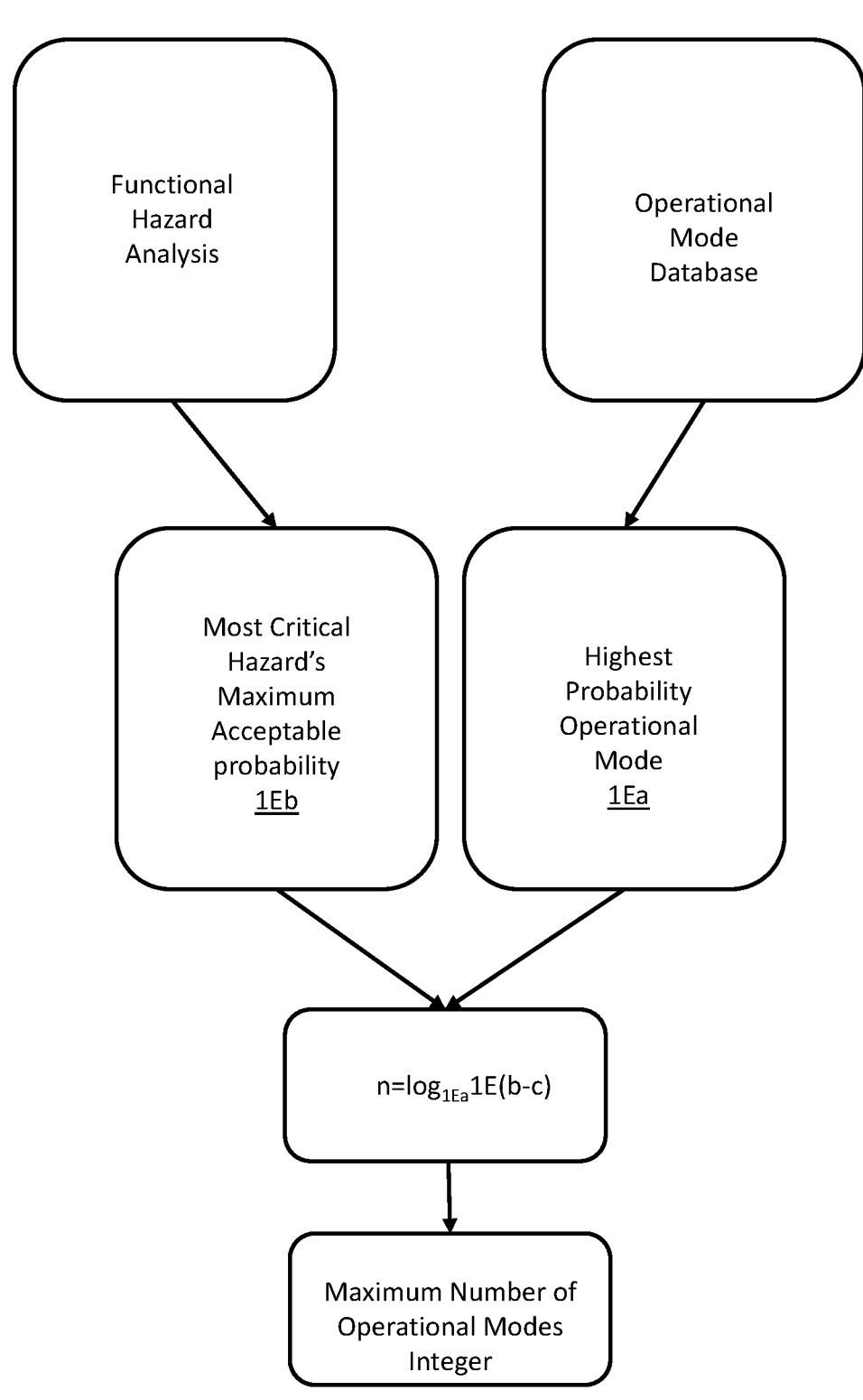
FIG. 3 is an illustration of determination of a maximum number of operational modes considered in the method of FIG. 1.

As indicated above, the method 100 comprises obtaining 102 an operational mode data space representing a set of operational modes for the aircraft braking system 400. The maximum number of possible operational modes, n, for the operational mode data space is selected to ensure that there will be no operational modes or accumulation of operational modes that exist which could impact the worst-case safety rate, i.e. the probability of the worst case operational mode occurring, based on the most probable component impairments. If we consider the highest probability operational mode to have a probability 1Ea, and the most critical operational mode's maximum acceptable probability to be 1Eb, then the maximum number of possible operational modes for the operational mode data space is given by:

$$n = \log_{1Ea} 1E(b-c),$$

where the factor of c is included to account for the cumulative probability of operational modes which do not individually or in small combinations cross the acceptable impairment rate, and is a non-negative integer. It will be appreciated that this factor is based on engineering judgement and may vary in practice. In some embodiments, the factor of c is equal to 7. The calculation of the maximum number of possible operational modes is illustrated schematically in FIG. 3.

Once the operational mode data space has been obtained, the method 100 comprises generating 104 a reduced operational mode data space comprising operational modes having a probability greater than a theoretical operational probability threshold. The theoretical operational probability threshold is a threshold utilised for all theoretical operational modes within the operational mode data space, with the theoretical operational probability threshold set such that operational modes having a probability less than the theoretical operational probability threshold are deemed sufficiently unlikely to occur in theory. Such operational modes are so unlikely to occur that removing them from the operational mode data space does not significantly impact its suitability to model operational modes that may occur to an aircraft.

Generating 104 the reduced operational mode data space comprises comparing obtained probability data for each operational mode to the theoretical operational probability threshold, and removing operational modes having a probability less than or equal to the theoretical operational probability threshold from the operational mode data space to leave behind the reduced operational mode data space.

Here the theoretical operational probability threshold is set such that the cumulative probability of those operational modes removed from the operational mode data space is less than the total probability required to achieve a necessary safety level for the aircraft system. That is to say, the sum of the probabilities of the operational modes removed from the operational mode data space is such that it does not exceed an acceptable probability for the most severe operational mode. The operational modes removed from the operational mode data space during generation of the reduced operational mode data space are referred to as a discarded operational mode data space.

Figure 4:
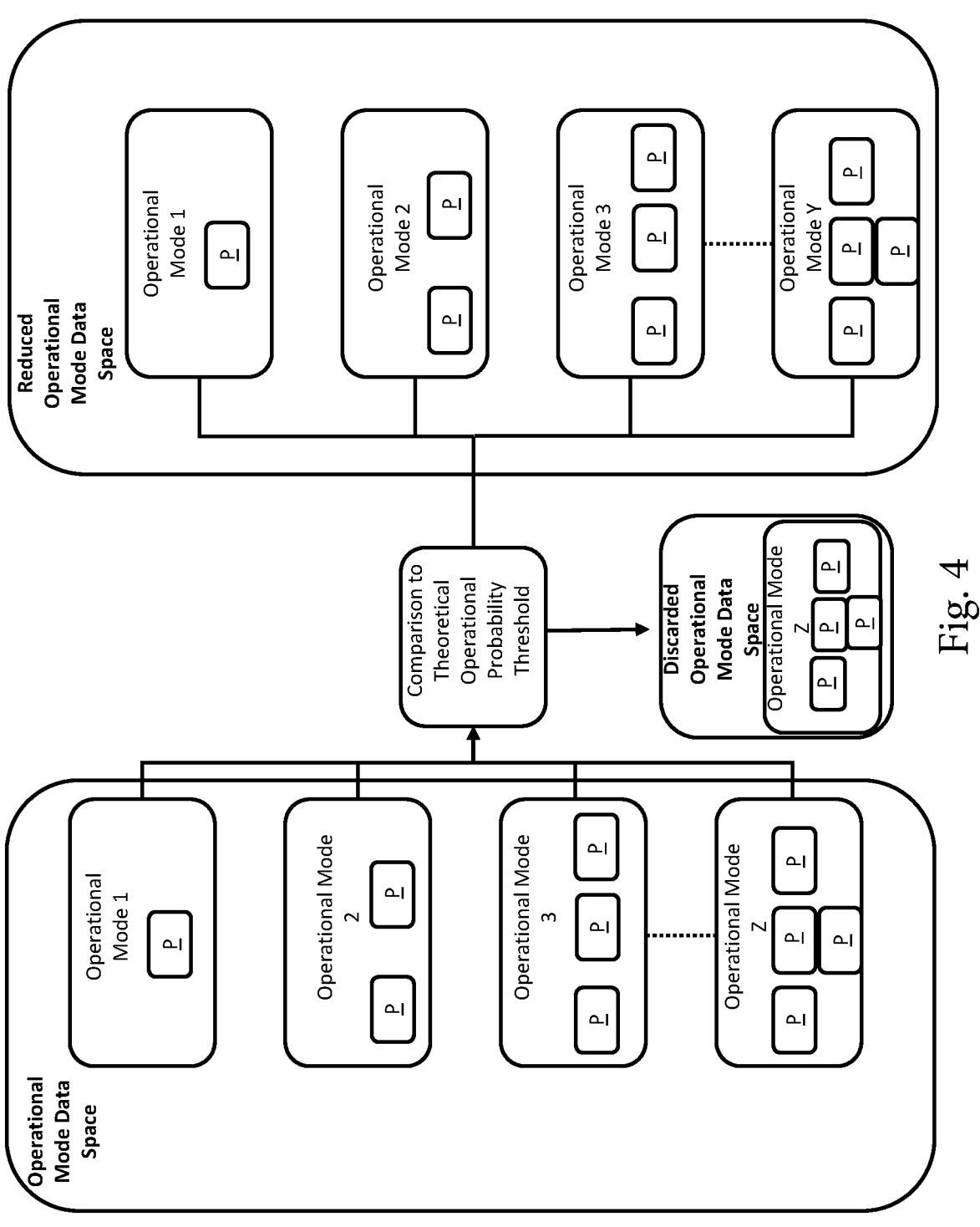
FIG. 4 is an illustration of generation of a reduced operational mode data space according to the method of FIG. 1.
Figure 5:
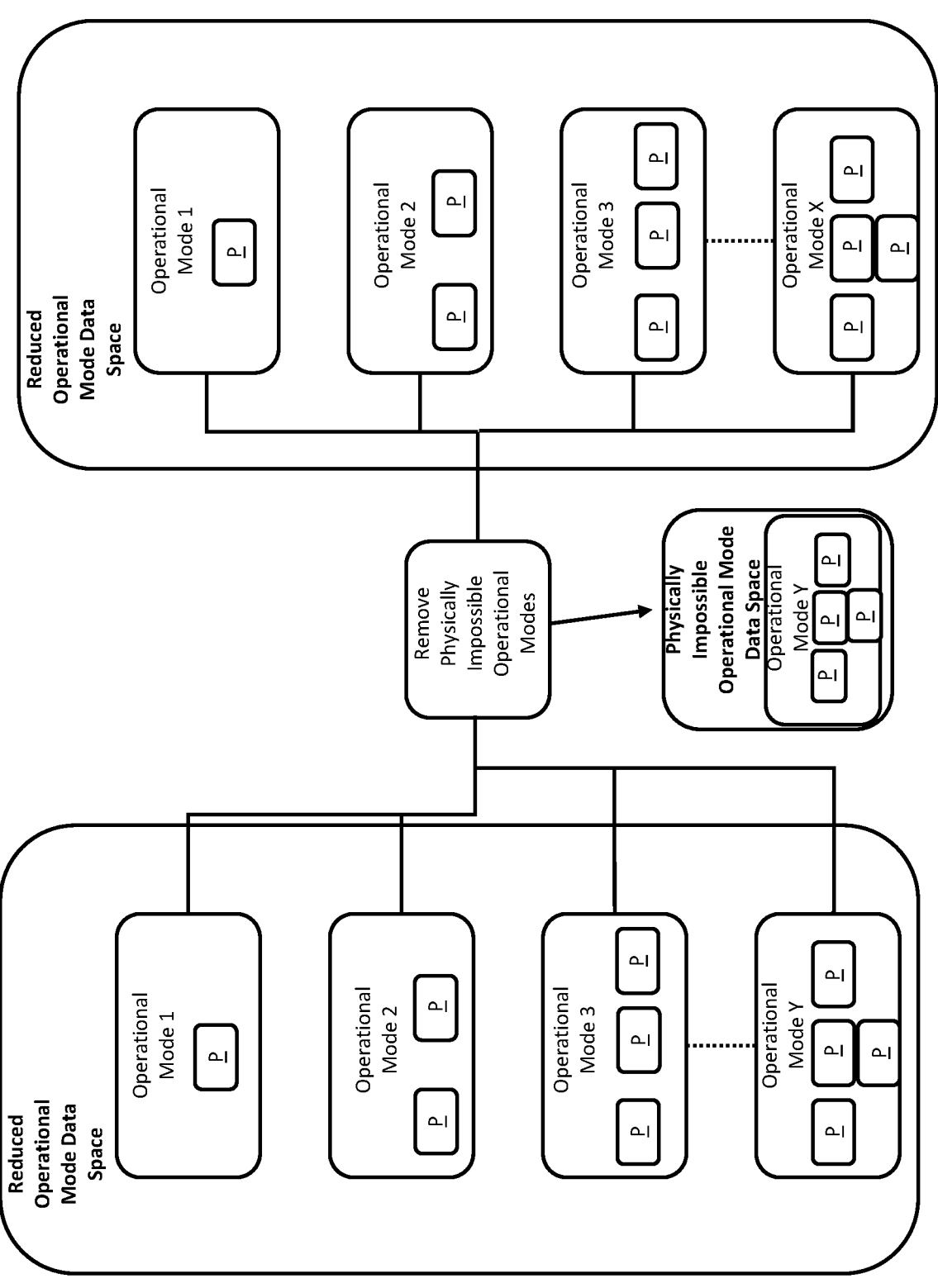
FIG. 5 is an illustration of removal of physically impossible operational modes from the reduced operational mode data space of FIG. 4.

The process of generating 104 the reduced operational mode data space comprising operational modes having a probability greater than a theoretical operational probability threshold is illustrated by the equations below, and FIGS. 4 and 5 (where P in Figures herein refers to the probability of a component impairment occurring):

$$F_{ALL} = \{f_1, f_2, \dots f_n\}$$

$$F_{CUTOFF_i} \subset F_{ALL}$$

$$F_{CUTOFF_i} = \{f \mid f > P\}$$

$$F_{REDUCED} = \sum_{f \subset F_{CUTOFF}} f$$

$$F_{DISCARDED} = \sum_{f \subset (F_{ALL} - F_{REDUCED})} f < R$$

where:
    f=occurrence rate of an operational mode
    P=the theoretical operational probability value
    n=the total number of operational modes R=the acceptable operational mode rate for the aircraft system
    $F_{ALL}$=operational mode data space
    $F_{REDUCED}$=reduced operational mode data space
    $F_{DISCARDED}$=discarded operational mode data space In some embodiments, physically impossible operational modes for the aircraft system are also removed from the reduced operational mode data space, with this illustrated in FIG. 5. Physically impossible operational modes will typically be identified by a system designer as a result of the model of the aircraft system discussed in reference to FIG. 2 and with reference to the schematic aircraft system of FIG. 13. For example, it may be the case that a particular impairment of a first component inevitably leads to impairment of a second component. In such a circumstance an operational mode indicative of impairment of the first component without impairment of the second component may be sensibly discounted.

Figure 6:
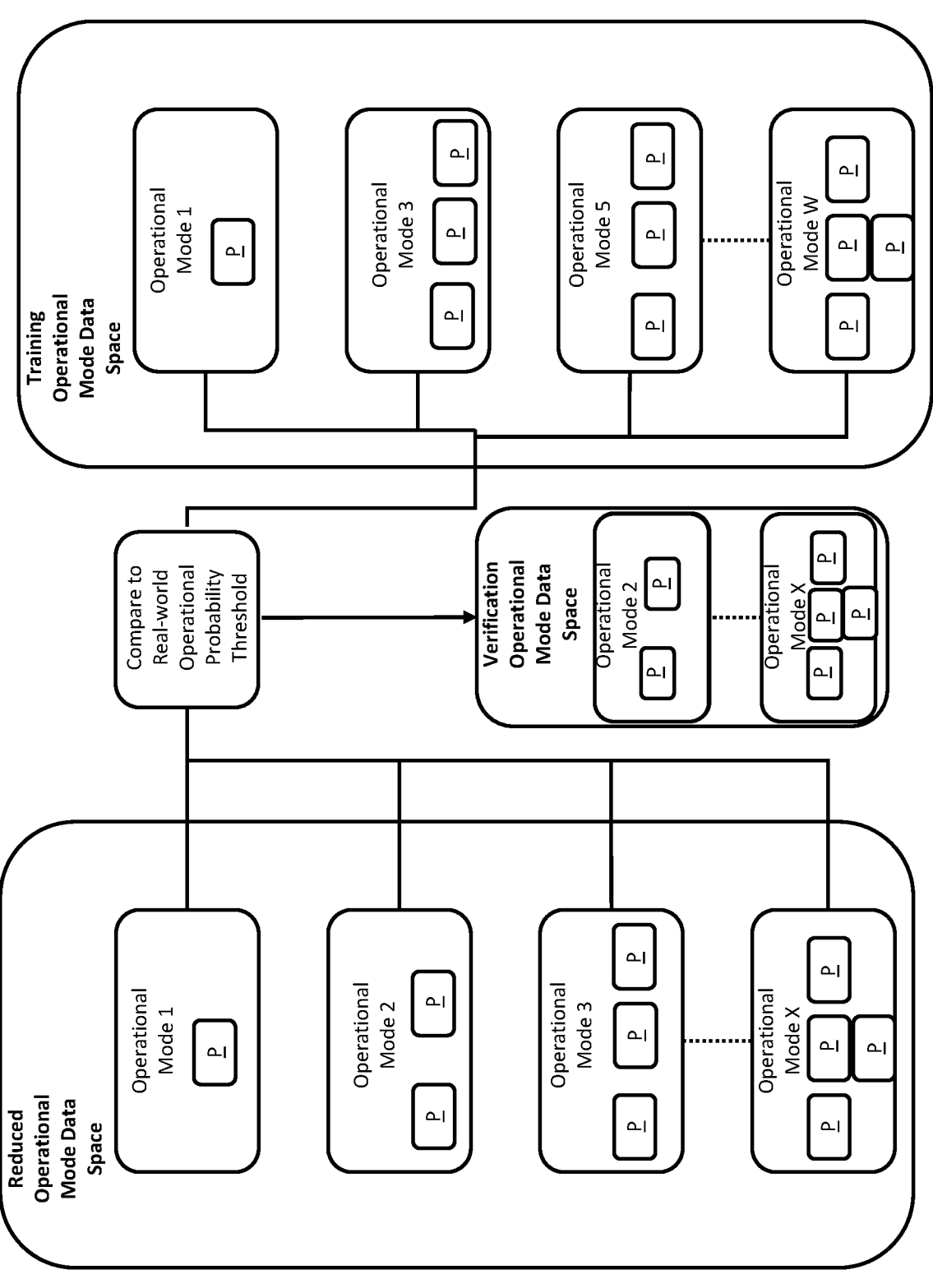
FIG. 6 is an illustration of generation of a training operational mode data space according to the method of FIG. 1.

Once the reduced operational mode data space has been obtained, the method 100 comprises generating 106 a training operational mode data space comprising operational modes within the reduced operational mode data space that have a probability less than a real-world operational probability threshold. Here, the real-world operational probability threshold is a threshold above which operational modes are deemed more likely to occur in real-world operation of the aircraft system 400, and below which operational modes are deemed less likely to occur in real-world operation of the aircraft system 400. Those operational modes deemed more likely to occur in real-world operation of the aircraft system 400 may relate directly to aircraft system requirements. Generating 106 the training operational mode data space in some embodiments includes removing operational modes having a probability greater than or equal to the real-world operational probability threshold from the reduced operational mode data space to leave behind the training operational mode data space. These removed operational modes define an operational mode data space. The generation of the training operational mode data space is illustrated schematically in FIG. 6.

Figure 7:
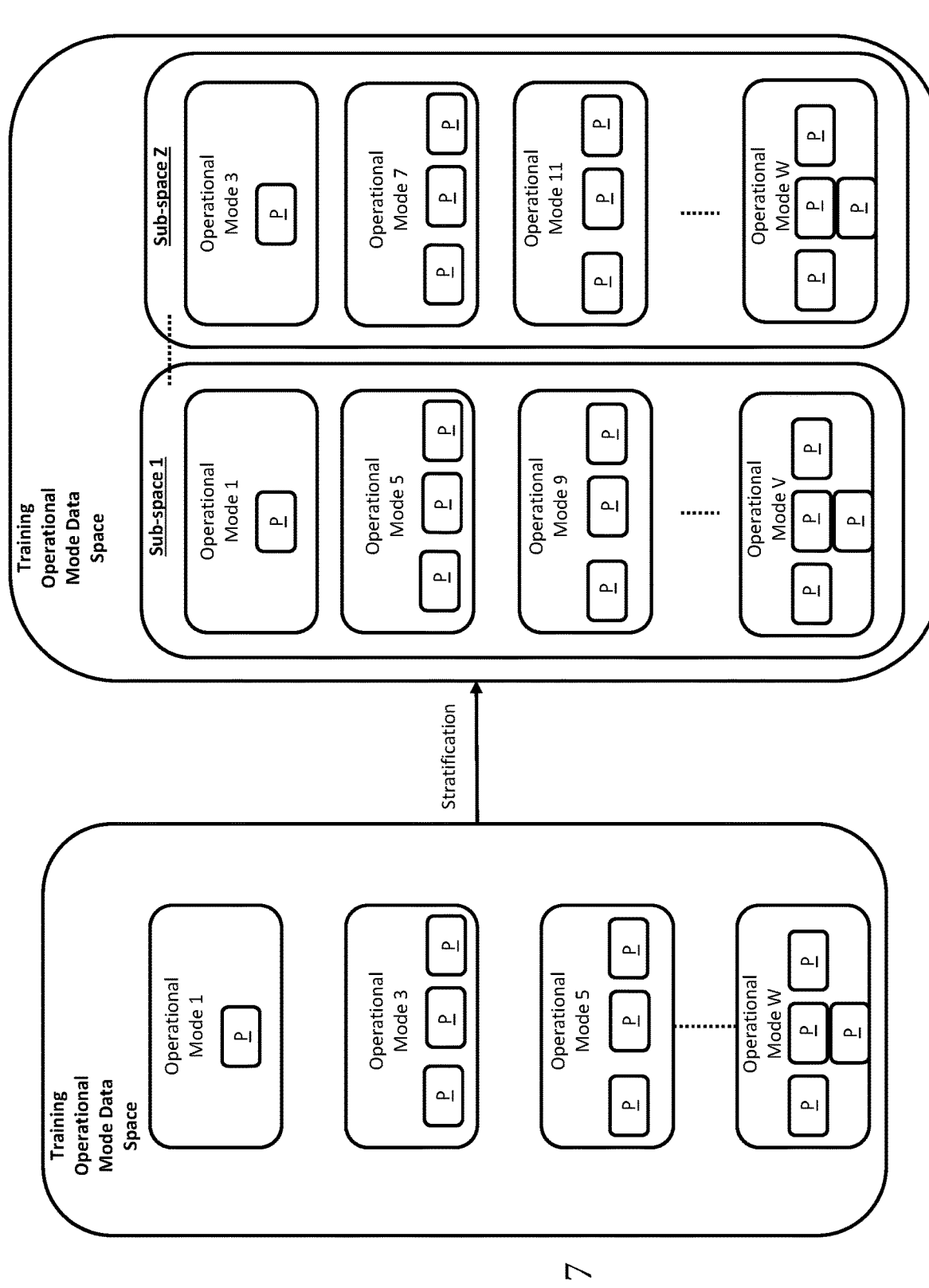
FIG. 7 is an illustration of stratification of the training operational mode data space of FIG. 6.
Figure 8:
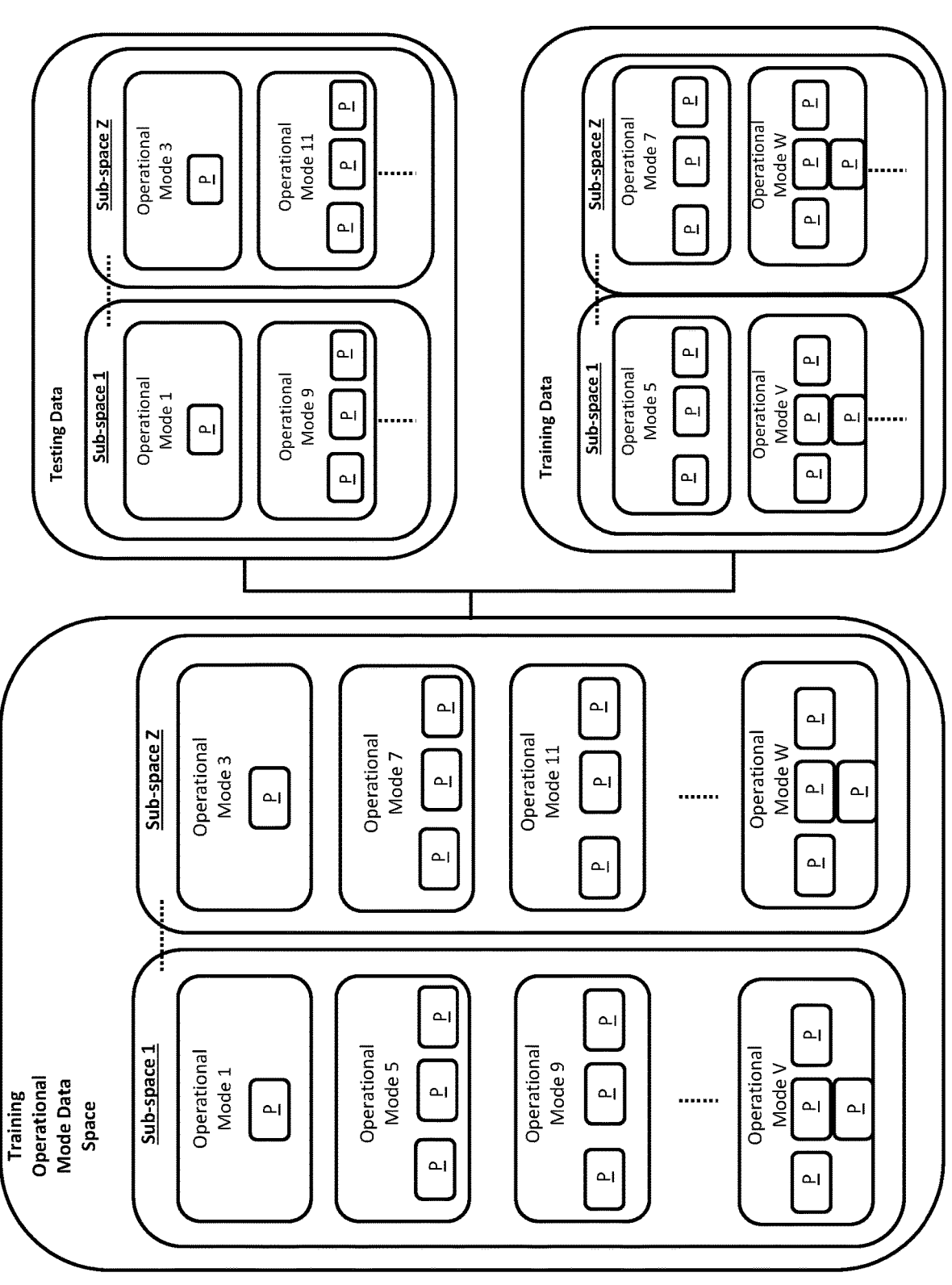
FIG. 8 is an illustration of splitting the stratified training operational mode data space of FIG. 7 into training data and testing data.

Before training 108 the neural network using operational modes within the training operational mode data space, the training operational mode data space is further split into a training data set and a testing data set. This is achieved by stratification of the training operational mode data space to generate a plurality of sub-spaces, as illustrated schematically in FIG. 7. As can be seen, the training operational mode data space is stratified by probability, such that each sub-space comprises operational modes having probabilities of the same order of magnitude. For example, a first sub-space comprises operational modes having a probability of occurrence of $10^{-7}$, whilst a second sub-space comprises operational modes having a probability of occurrence of $10^{-8}$. Operational modes within each sub-space are then randomly assigned to one of the training data set and the testing data set, whilst respecting the probability distribution of operational modes within the sub-spaces and hence within the reduced operational mode data space. This is illustrated in FIG. 8. In this example, there are no common operational modes between the training data set and the testing data set, which ensures independence. Although split entirely here between the training data set and the testing data set, it will be appreciated that in practice there may be a third, unused, data set, which may be utilised to reduce computational burden in training and testing the neural network.

Furthermore, in some embodiments the plurality of sub-spaces are further stratified based on a structure of the aircraft system 400, for example components of the aircraft system 400, to generate a plurality of further subspaces, before splitting the plurality of further sub-spaces into the training data set and the testing data set. This may ensure that the aircraft system 400 is properly represented within the training data set and the testing data set. In one embodiment, where the aircraft system 400 is an aircraft braking system, the aircraft system 400 may have four braking actuators. In this case, each of the plurality of sub-spaces are stratified to generate four further sub-spaces, one per actuator, leading to sixteen further sub-spaces in total. The concept of stratification into subspaces can be applied as many times as desired to ensure that the training data set and the testing data set properly represent the aircraft system 400.

Training 108 the neural network then includes training the neural network using the training data set, and testing the neural network using the testing data set, with the training and testing taking place on the neural network as a stand-alone object.

In such a manner, the neural network is trained, and tested, using operational modes that are less likely to occur in real-world operation. By training the neural network using operational modes that are less likely to occur in real-world operation of the aircraft system, the neural network may be better equipped to deal with a wider range of operational modes, including operational modes that are more likely to, and less likely to, occur during real-world operation of the aircraft system. This may be preferable to simply randomly selecting operational modes from the operational mode data space and training the neural network using those randomly selected operational modes.

Furthermore, in practice the operational mode data space may be relatively large, for example comprising a magnitude in the order of $10^{50}$ operational modes or greater. By initially generating a reduced operational mode data space using operational modes having a probability greater than a theoretical operational probability threshold, those operational modes which are statistically unlikely in theory, let alone in practice, may be removed from consideration, which may provide a reduced data set of a more manageable magnitude from which the neural network can be trained.

To test operation of the neural network, the training of the neural network in presently preferred embodiments further comprises verifying operation of the neural network when embedded in the aircraft system 400, for example in a test aircraft. Using the operational mode data space, which comprises those operational modes more likely to occur in real-world operation of the aircraft system 400. It will be appreciated that the operational modes of the operational mode data space are independent to those of the training operational mode data space, and hence independent from the operational modes defining the training data set and the testing data set.

For a neural network with a single binary output, it can be seen that the output space of the neural network will have been fully explored if the neural network outputs all values of the single output within its testing and training data. This is illustrated by Table 1 below.

TABLE 1

| Operational Mode | Output |
| --- | --- |
| A | 0 |
| B | 1 |

For a neural network with multiple outputs that can each take a binary value, it can be seen that the output space will have been fully explored if the neural network outputs all values for every output and every combination of output values for all outputs within its training and testing data. This is illustrated by Table 2 below.

TABLE 2

| Operational Mode | Output α | Output β |
| --- | --- | --- |
| A | 0 | 0 |
| B | 0 | 1 |
| C | 1 | 0 |
| D | 1 | 1 |

Although illustrated here with binary outputs, neural networks are also envisaged which have a more complex set of outputs.

Figure 9:
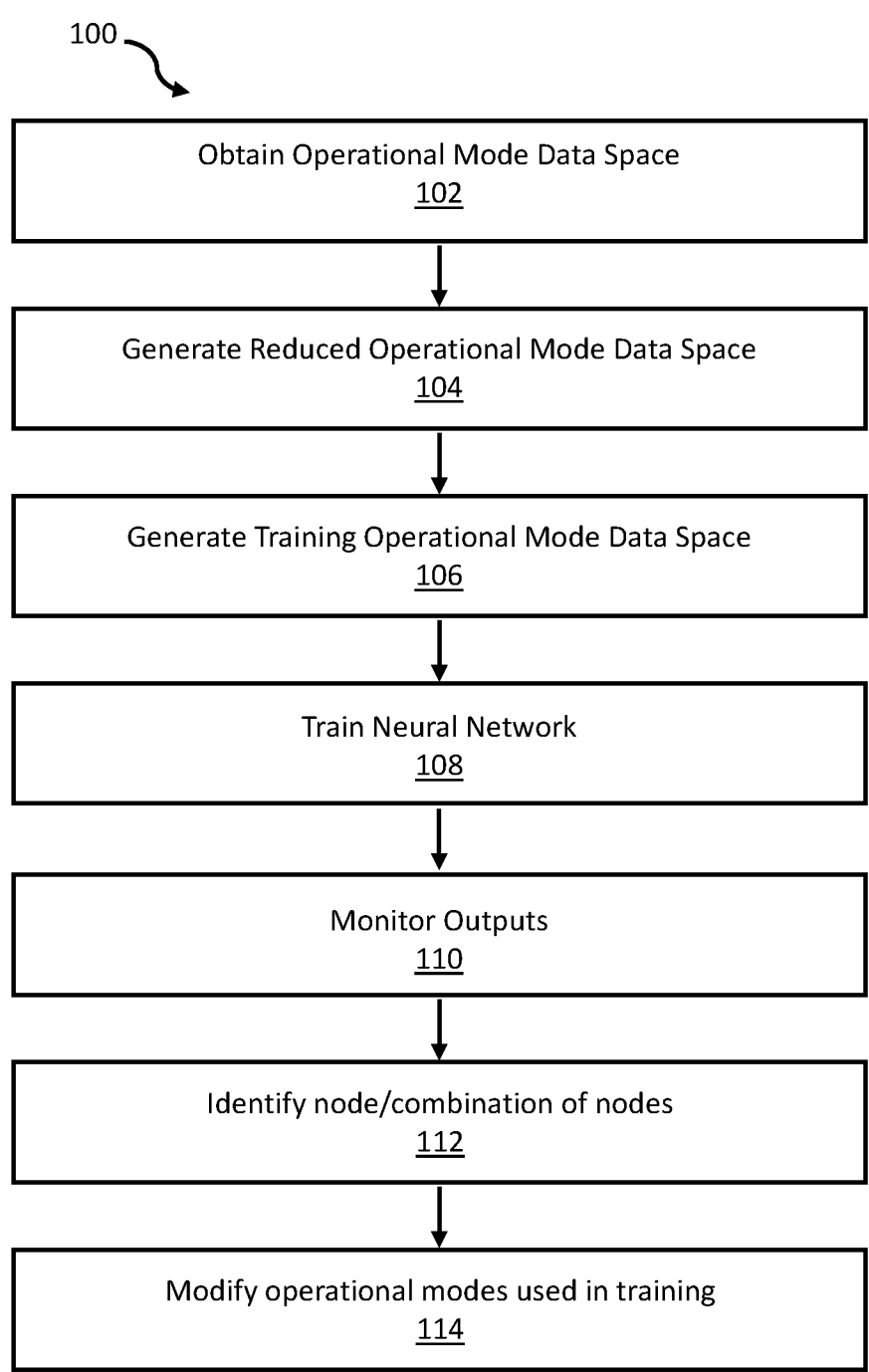
FIG. 9 is an illustration of an embodiment of the method of FIG. 1 where outputs of the neural network are monitored in training.
Figure 10:
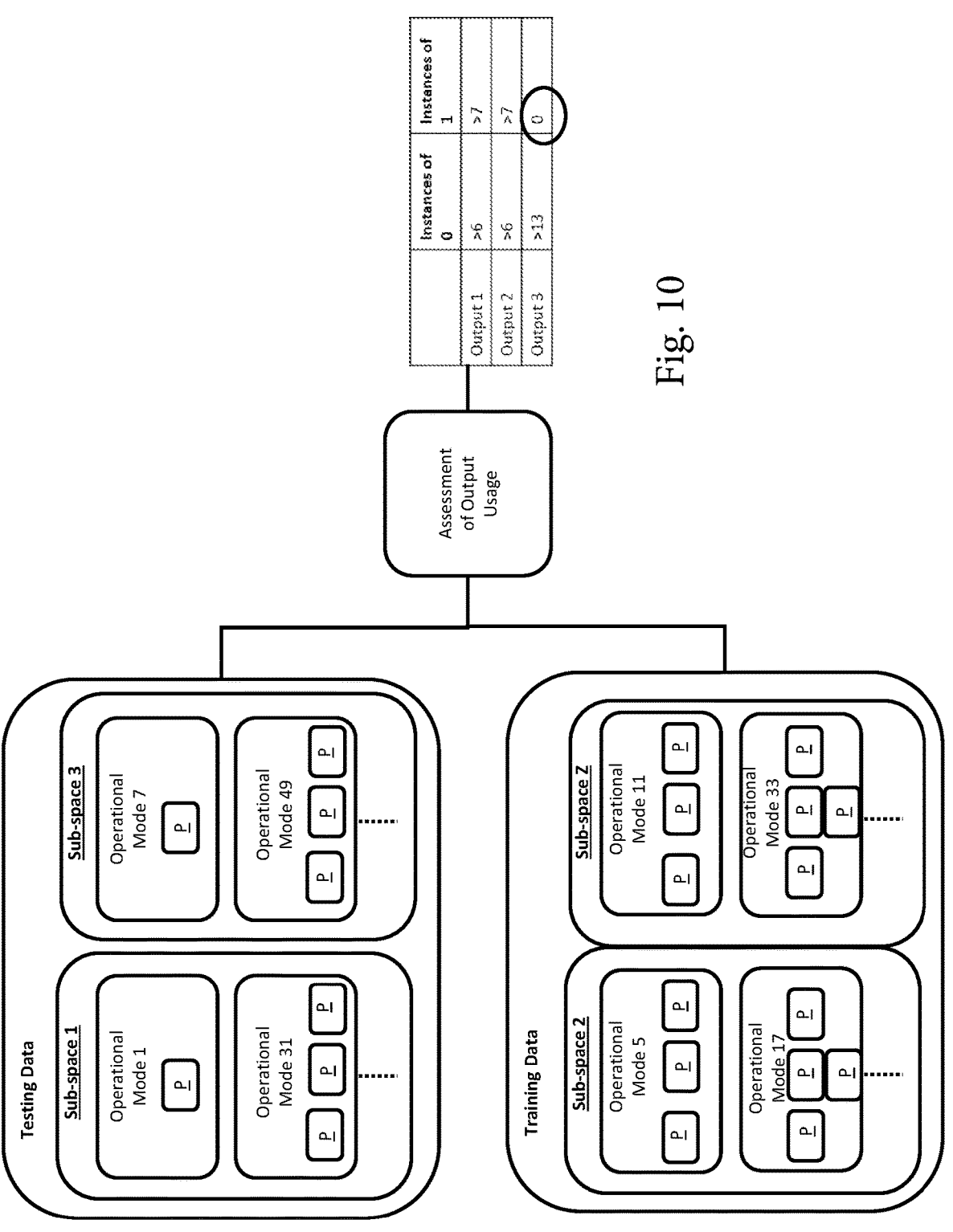
FIG. 10 is a further illustration of the embodiment of the method of FIG. 9.

To ensure the output space of the neural network sufficiently covers the desired design space, in some embodiments, training 108 the neural network includes monitoring 110 outputs from a plurality of nodes of the neural network during training of the neural network to determine activity data representing activity of the plurality of nodes, identifying 112 a node or combination of nodes having activity levels below an activity level threshold using the activity data, and modifying 114 the operational modes used to train the neural network based on the identified node or combination of nodes. Such an embodiment of the method is illustrated in FIGS. 9 and 10. This may enable modification of the neural network to ensure that the neural network is operating to the desired level of accuracy, and/or may allow for modification of the neural network to remove unnecessary nodes or unnecessary combinations of nodes. For example, operational modes may be added to ensure that each node or combination of nodes of the neural network is utilised to provide full design space coverage. Alternatively, this may enable modification of the neural network to ensure that the neural network is operating to the desired level of accuracy, and/or may allow for modification of the neural network to remove unnecessary nodes or unnecessary combinations of nodes. For example rarely used output nodes of the neural network may be removed, whilst retaining the accuracy of output of the neural network. The activity level threshold is a pre-determined threshold set by a system engineer. In the illustrative embodiment of FIG. 10, it can be seen that for Output 3 there are no instances of the value 1 that occur, indicating activity level below the activity level threshold.

In some embodiments, a greater number of operational modes from within the training operational mode data space are utilised to train the neural network where a node or combination of nodes is identified with an activity level below the activity level threshold. In particular, operational modes from the testing data set or the unused data set are added to the training data set to try and achieve a desired activity level which means that the design space has been sufficiently explored.

In some embodiments where all initial operational modes contained within the training operational mode data space are utilised in training the neural network and an activity level below the activity level threshold is identified, operational modes from the reduced operational mode data space, and in particular operational modes from the operational mode data space are removed and added to the training operational mode data space to try and achieve a desired activity level which means that the design space has been sufficiently explored.

In some embodiments, where all initial operational modes contained within the training operational mode data space and all initial operational modes contained within the reduced operational mode data space are utilised in training the neural network and an activity level below the activity level threshold is identified, operational modes from the discarded operational mode data space are added to the training operational mode data set to try and achieve a desired activity level which means that the design space has been sufficiently explored.

The embodiments described above where operational modes are added to the training operational mode data space where insufficient activity level of nodes or combinations of nodes of the neural network is identified may ensure that a sufficient percentage of the design space has been explored during training of the neural network.

Impaired component operation and operational modes as described in this document may relate to a variety of possible conditions that occur to an aircraft system and its component parts. Some may result in continued operation of the component at an altered level, while others may result in that component no longer being able to fulfil its purpose such that a backup component or set of components should be used in its stead.

Figure 11:
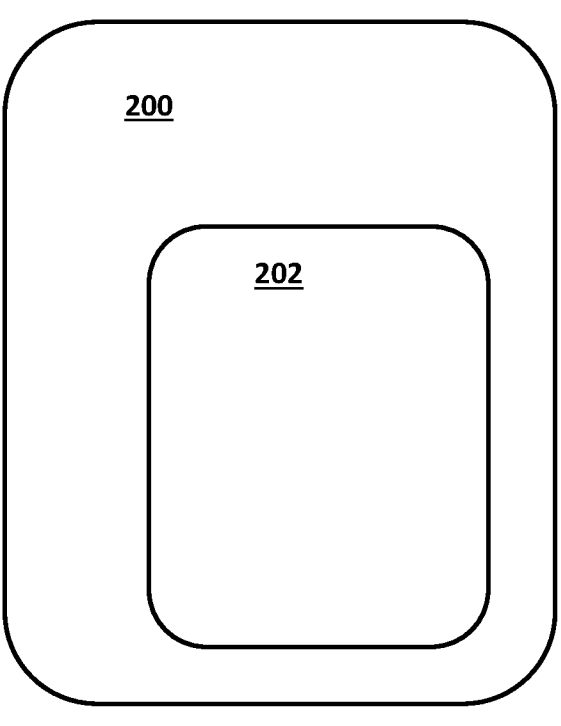
FIG. 11 is an illustration of a data carrier according to the present invention.

A data carrier 200 comprising machine readable instructions 202 to cause operation of a processor 302 of a computer system 300 to perform the method 100 is illustrated schematically in FIG. 11. Here the data carrier 200 is any appropriate data carrier having a memory capable of storing the machine-readable instructions 202. The data carrier 200 may be embedded in the aircraft system 400 in use.

Figure 12:
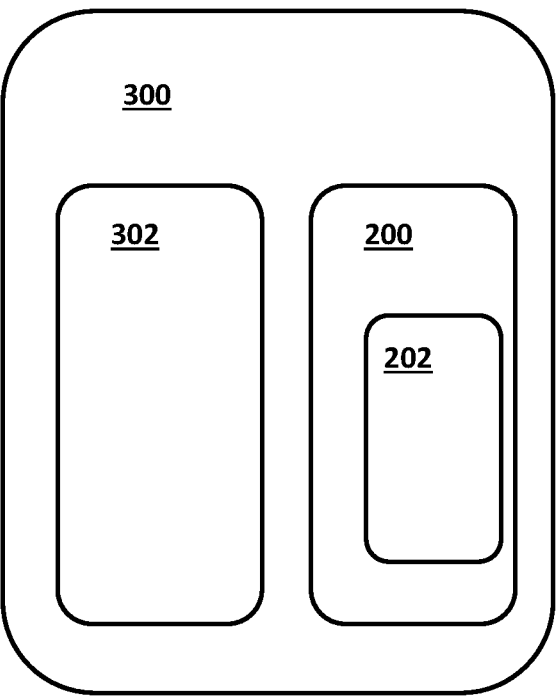
FIG. 12 is an illustration of a computer system according to the present invention.

A computer system 300 for training a neural network according to the method 100 is illustrated schematically in FIG. 12, with the computer system 300 comprising a processor 302 and the data carrier 200 of FIG. 11. The processor 302 is able to process the machine-readable instructions 202 of the data carrier 200 to perform the method 100 previously described herein. The processor may take any appropriate form.

Figure 13:
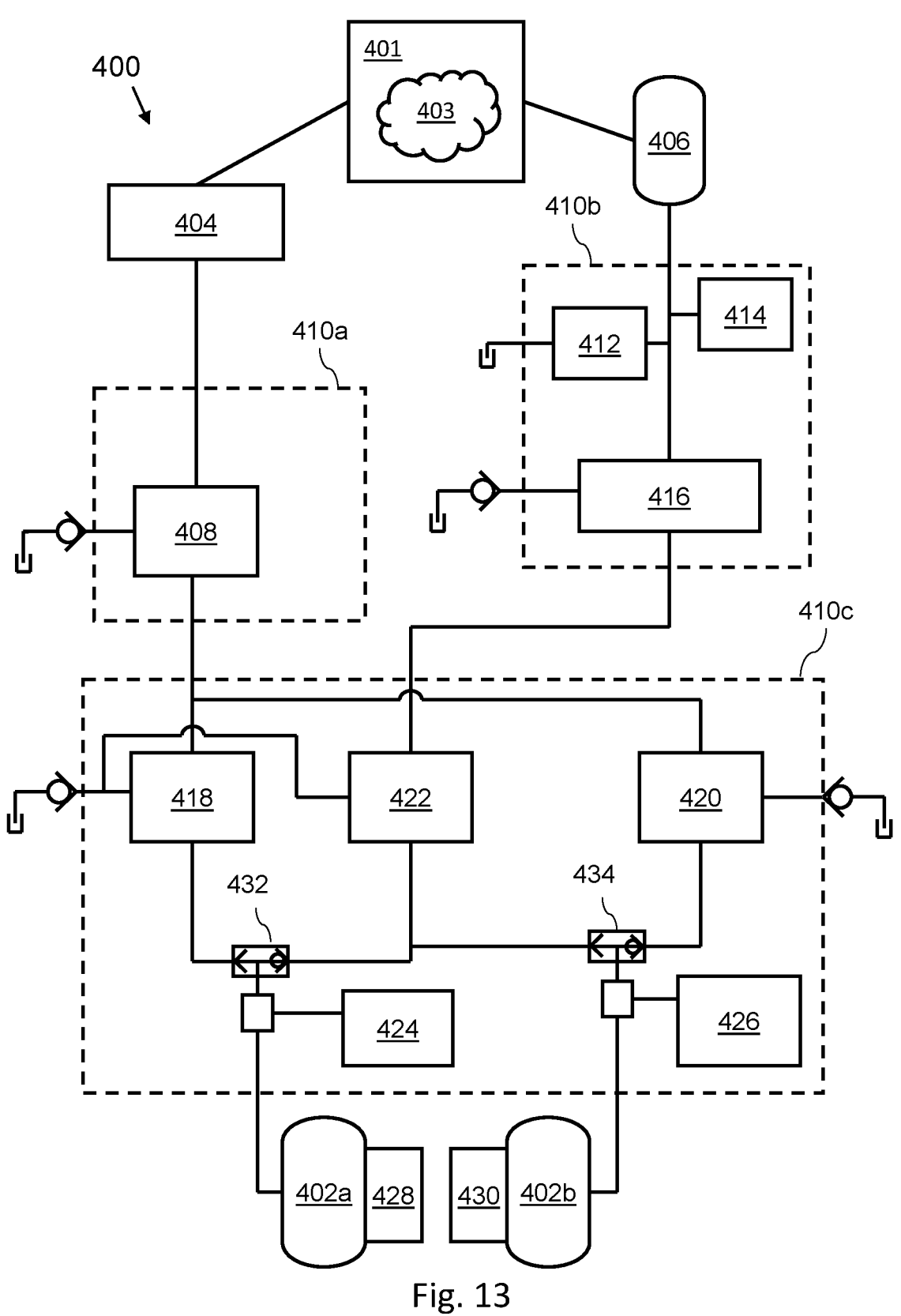
FIG. 13 is an illustration of an aircraft system according to the present invention.

An aircraft system 400, in the form of a hydraulic braking system 400, is illustrated schematically in FIG. 13. The braking system 400 comprises a brake controller 401, with the brake controller 401 including a neural network 403 trained according to the method 100. In some examples the brake controller 403 is programmed to include the logic of a neural network trained according to the method 100.

The hydraulic braking system 400 shown in FIG. 13 comprises components which are operated in order to control brakes 402a, 402b. The brakes 402a and 402b can be operated either using a primary power supply or an alternative power supply. In this example, the primary power supply is provided by a hydraulic pump 404, and the secondary power supply is provided by a hydraulic accumulator 406. A selector valve 408 selects operation using the primary power supply 404 in a primary selector system 410a. Under normal operation, the primary power supply 404 is used and so the selector valve 408 may be referred to as the normal selector valve 408. The primary selector system 410a may also comprise other components including monitoring equipment (not shown). Operating the normal selector valve 408 comprises providing an electrical signal to a coil which actuates the valve. The normal selector valve 408 may comprise two such coils for redundancy purposes.

The hydraulic accumulator 406 is a pressurised container. When used to operate the brakes 402a and 402b, the pressure which is delivered to the rest of the braking system from the accumulator 406 is monitored and controlled to ensure the safe operation of the brakes 402a and 402b. To this end, there is provided a secondary selector system 410b. The secondary selector system 410b comprises a relief valve 412, to control the pressure of fluid released from the accumulator 406, a pressure transducer 414 for monitoring the pressure from the hydraulic accumulator 406, and a secondary selector valve 416 to select the hydraulic accumulator 406 as the power supply for operating the brakes 402a and 402b.

After the operation of either the normal selector valve 408 or the secondary selector valve 416, power, in the form of pressurised fluid, is provided in the brake operation system 410c. A first servo valve 418 and a second servo valve 420 are used to control the supply of hydraulic fluid from the hydraulic pump 404 to the first 402a and second 402b brakes respectively. A third servo valve 422 is used to control the supply of hydraulic fluid provided by the accumulator 406 to the first 402a and second 402b brakes. The hydraulic braking system 400 comprises two pressure transducers 424 and 426 for monitoring the pressure of hydraulic fluid being provided to each of the brakes 402a and 402b.

Shuttle valves 432, 434 are included between the first 418, second 420, and third 422 servo valves and the brakes 424, 420 to ensure that the highest-pressure input is fed through to the brakes. The use of shuttle valves prevents the pressurised fluid from the accumulator 406 from being fed back into the primary power supply, and vice versa. In other words, these shuttle valves ensure that fluid delivered from the accumulator goes to the brakes and not backwards through the first 418 and second 420 servo valves.

Two tachometers 428 and 430 are used to monitor the speed of the wheels during braking to provide feedback in the braking control system. It will be appreciated that other components not shown may also be included and used in the hydraulic braking system 400, such as further sensors, actuators, and the like. It is also to be understood that while specific examples of equipment have been described herein, other equipment may also be used. For example, a wheel speed sensor other than a tachometer may be used to monitor the speed of the wheels during braking. Similarly, other pressure sensors rather than pressure transducers may be used to monitor the pressure in the hydraulic braking system 400.

Each of the mechanical components of the hydraulic braking system 400, for example the brakes 402a, 402b, the hydraulic accumulator 406, the selector valve 408 and so on, has an associated probability value indicative of the probability of impaired operation of that component, with combinations of impaired component operation being considered operational modes as described herein. These operational modes are used in training of the neural network 403 using the method 100 described above.

In use, the trained neural network 403 is able to automatically control reconfiguration of the brake controller 401 in the event of operational modes occurring for any of the components of the hydraulic braking system 400. An example of impairment of operation of a component of the hydraulic braking system 400 is where the selector valve 408 is stuck open due to debris from the hydraulic fluid jamming the valve. Such impairment would result in an operational mode of the aircraft system as described herein. The selector valve 408 may have more than one other possible source of impairment. For instance, one or more electrical wires may break. This would be considered an operational mode herein having its own probability of occurring, for example, based on technical specifications and operational performance histories. A further example of an operational mode is a combination of component impairments, such as where the selector valve 408 and the relief valve 412 are both stuck open at the same time. This combination of component impairments would probably be unrelated (i.e. because their respective systems are different and separated) and so the combined probability of both occurring at the same time may be relatively low for that operational mode. On the other hand, a tyre bursting, rendering the respective brakes e.g. brakes 402*a* and 402*b* ineffectual, and debris from the tyre impacting and damaging a component of the brake operation system 410*c,* may be a plausible combination of related component impairments and would therefore represent an operational mode herein. Each element of such a combination of component impairments would have its own probability of occurring, giving the respective operational mode an overall probability of occurring. It will be appreciated that any component impairment, or combination of component impairments, may give rise to an operational mode as discussed herein.

Whilst illustrated above in the context of a particular hydraulic braking system 400, it will be appreciated that neural networks trained according to the method 100 describe herein may be embedded in any appropriate aircraft system to deal with operational modes that may occur during operation of the aircraft system.

Figure 14:
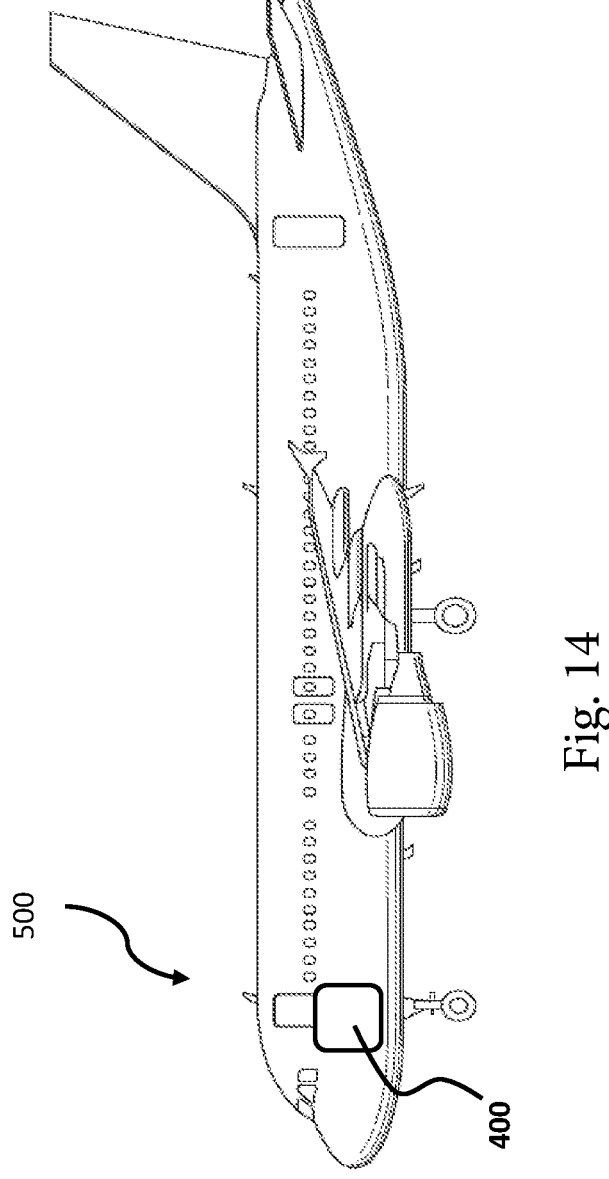
FIG. 14 is an illustration of an aircraft according to the present invention.

An aircraft 500 comprising the braking system 400 is illustrated schematically in FIG. 14.

It will be appreciated that, in practice, additional datasets to those utilised in the method 100 described herein may be utilised in training a neural network for controlling an aircraft system. Furthermore, it will be appreciated that other testing and training methods may be utilised in addition to the method disclosed herein to provide a robust neural network capable of controlling an aircraft system.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A method of training a neural network to control an aircraft braking system having a plurality of aircraft braking system components, the method comprising:

obtaining an operational mode data space representing a set of operational modes for the aircraft braking system, wherein each operational mode represents a configuration of the aircraft braking system where performance of one or more of the plurality of aircraft braking system components is impaired and comprises probability data indicating a respective positive and non-zero probability of the operational mode occurring, according to a model of the aircraft braking system,

16 wherein the plurality of aircraft braking system components comprise one or more of a power supply selector valve and an actuator;

generating a reduced operational mode data space limited to the operational modes having a probability greater than a theoretical operational probability threshold and excluding the operational modes having a probability less than the theoretical operational probability;

generating a training operational mode data space limited to the operational modes within the reduced operational mode data space that have a probability less than a real world operational probability threshold and excluding the operational modes within the reduced operational mode data space having a probability greater than the real-world operational probability threshold; and training the neural network using operational modes within the training operational mode data space, to control reconfiguration of the braking system by controlling one or more of the power supply selector valve and the actuator.

2. The method according to claim 1, wherein the method comprises stratifying the training operational mode data space to generate a plurality of sub-spaces based on the obtained probability data, selecting a first set of operational modes from the plurality of sub-spaces, selecting a second set of operational modes from the plurality of sub-spaces, the second set of operational modes different from the first set of operational modes, training the neural network using the first set of operational modes, and testing the neural network using the second set of operational modes.

3. The method according to claim 2, wherein each operational mode of the first set of operational modes is different from each operational mode of the second set of operational modes.

4. The method according to claim 2, wherein selecting the first and second sets of operational modes comprises randomly selecting the first and second sets of operational modes from the plurality of sub-spaces.

5. The method according to claim 2, wherein selecting the first and second sets of operational modes comprises selecting operational modes from the plurality of sub-spaces such that each of the first and second sets of operational modes has the same distribution of probabilities as the training operational mode data space.

6. The method according to claim 2, wherein the method further comprises stratifying the plurality of sub-spaces based on a structure of the aircraft braking system to generate a plurality of further sub-spaces, selecting the first set of operational modes from the plurality of further sub-spaces and selecting the second set of operational modes from the plurality of further sub-spaces.

7. The method according to claim 1, wherein the method further comprises generating an operational mode data space using operational modes present in the reduced operational mode data space but absent from the training operational mode data space, and verifying operation of the neural network using operational modes within the operational mode data space.

8. The method according to claim 1, wherein the theoretical operational probability threshold is set such that operational modes present in the operational mode data space but absent from the reduced operational mode data space comprise a cumulative probability less than an acceptable safety level for the aircraft braking system.

9. The method according to claim 1, wherein a size of the operational mode data space is determined based on a maximum acceptable probability of a determined critical operational mode according to the model of the aircraft braking system, and an operational mode having a highest probability according to the model of the aircraft braking system.

10. The method according to claim 1, wherein the neural network comprises a plurality of nodes, and the method comprises monitoring outputs from the plurality of nodes during training of the neural network to determine activity data representing activity of the plurality of nodes, identifying a node or combination of nodes having activity levels below an activity level threshold using the activity data, and modifying the operational modes used to train the neural network based on the identified node or combination of nodes.

11. The method according to claim 10, wherein modifying the operational modes used to train the neural network based on the identified node or combination of nodes comprises utilising a greater number of operational modes from within the training operational mode data space.

12. The method according to claim 10, wherein modifying the operational modes used to train the neural network based on the identified node or combination of nodes comprises adding operational modes to the training operational mode data space from the reduced operational mode data space.

13. The method according to claim 10, wherein modifying the operational modes used to train the neural network based on the identified node or combination of nodes comprises adding operational modes to the training operational mode data space from the operational mode data space.

14. The method according to claim 1, wherein the model of the aircraft braking system comprises a directed graph comprising one or more vertices, and each vertex represents operation of at least one of the aircraft braking system components of the aircraft braking system.

15. The method according to claim 1, wherein the aircraft braking system comprises a braking system, and each operational mode represents a respective set of possible braking component impairments according to a model of the aircraft braking system.

16. The method according to claim 1, wherein operational modes present in the operational mode data space but absent from the reduced operational mode data space define a discarded operational mode data space, and the discarded operational mode data space comprises a cumulative probability less than an acceptable safety level for the aircraft braking system.

17. A method of training a neural network to control an aircraft braking system having a plurality of aircraft braking system components, the method comprising:

obtaining an aircraft braking system operational mode data space representing a set of operational modes for the aircraft braking system, wherein each operational mode represents a configuration of the aircraft braking system where performance of one or more of the plurality of aircraft braking system components is impaired, according to a model of the aircraft braking system, wherein the plurality of aircraft braking system components comprise one or more of a power supply selector valve and an actuator;

obtaining probability data indicative of probabilities of the operational modes occurring, wherein each of the probabilities is positive and greater than a zero probability;

comparing obtained probability data for each operational mode to a theoretical operational probability threshold, wherein each of the probabilities is greater than a zero probability;

removing operational modes having a probability less than or equal to the theoretical operational probability threshold from the aircraft braking system operational mode data space to leave behind a reduced aircraft braking system operational mode data space, wherein the reduced aircraft braking system operational mode data space is limited to the operational modes from the operational mode data space having a probability greater than the theoretical operational probability threshold and excludes the operational modes in the operational mode data space having a probability equal or less than the theoretical operational probability threshold;

comparing obtained probability data for operational modes within the reduced aircraft braking system operational mode data space to a real-world operational probability threshold;

removing operational modes having a probability greater than or equal to the real-world operational probability threshold from the reduced aircraft braking system operational mode data space to leave behind a training aircraft braking system operational mode data space, wherein the operational modes remaining in the training aircraft braking system operational mode data space is limited to the operational modes in the reduced aircraft braking system operational mode data space having a probability less than the real-world operational probability threshold; and training the neural network using operational modes within the training aircraft braking system operational mode data space, to control reconfiguration of the braking system by controlling one or more of the power supply selector valve and the actuator.

18. A data carrier comprising machine-readable instructions for the operation of a processor of a computer system to perform the method according to claim 1.

19. A computer system for training a neural network to control the aircraft braking system, the computer system comprising a processor and a data carrier according to claim 18.

20. An aircraft braking system comprising a neural network trained according to the method of claim 1.

21. The method of claim 1, wherein:

the generating of the reduced operational mode includes selecting for the reduced operational mode data space the operational modes from the operational mode data space having a probability greater than the theoretical operational probability threshold and excluding for use in the reduced operational mode data space the operational modes in the operational mode data space having a probability equal or less than the theoretical operational probability threshold; and the generating of the training operational mode data space selects for the training operational mode data space the operational modes in the reduced operational mode data space having a probability less than the real-world operational probability threshold and excludes for use in the training operational mode data space operational modes the operational modes in the reduced operational mode data space having a probability equal to or greater than the real-world operational probability threshold.

* * * * *